(12) United States Patent
Hubbard

(10) Patent No.: US 9,609,001 B2
(45) Date of Patent: *Mar. 28, 2017

(54) SYSTEM AND METHOD FOR ADDING CONTEXT TO PREVENT DATA LEAKAGE OVER A COMPUTER NETWORK

(71) Applicant: Websense, LLC, Austin, TX (US)

(72) Inventor: Daniel Lyle Hubbard, Carlsbad, CA (US)

(73) Assignee: Websense, LLC, Austin, TX (US)

( * ) Notice: Subject to any disclaimer, the term of this patent is extended or adjusted under 35 U.S.C. 154(b) by 146 days.

This patent is subject to a terminal disclaimer.

(21) Appl. No.: 14/599,967

(22) Filed: Jan. 19, 2015

(65) Prior Publication Data

US 2015/0143476 A1    May 21, 2015

Related U.S. Application Data

(63) Continuation of application No. 12/022,838, filed on Jan. 30, 2008, now Pat. No. 8,938,773.

(60) Provisional application No. 60/887,908, filed on Feb. 2, 2007.

(51) Int. Cl.
 *H04L 29/06* (2006.01)
 *H04L 12/58* (2006.01)

(52) U.S. Cl.
 CPC .......... *H04L 63/123* (2013.01); *H04L 12/585* (2013.01); *H04L 51/12* (2013.01); *H04L 63/0245* (2013.01); *H04L 63/107* (2013.01)

(58) Field of Classification Search
 None
 See application file for complete search history.

(56) References Cited

U.S. PATENT DOCUMENTS

| 5,414,833 | A | 5/1995 | Hershey et al. |
| 5,581,804 | A | 12/1996 | Cameron et al. |
| 5,590,403 | A | 12/1996 | Cameron et al. |
| 5,596,330 | A | 1/1997 | Yokev et al. |
| 5,712,979 | A | 1/1998 | Graber et al. |
| 5,720,033 | A | 2/1998 | Deo |
| 5,724,576 | A | 3/1998 | Letourneau |
| 5,801,747 | A | 9/1998 | Bedard |

(Continued)

FOREIGN PATENT DOCUMENTS

| CN | 1367595 | 9/2002 |
| CN | 1756147 A | 4/2006 |

(Continued)

OTHER PUBLICATIONS

"Google + StopBadward.org = Internet Gestapo?", http://misterpoll.wordpress.com/2007/01/05/google-stopbadwareorg-internet-gestapo/, Jan. 5, 2007.

(Continued)

*Primary Examiner* — Kaveh Abrishamkar
(74) *Attorney, Agent, or Firm* — Schwegman Lundberg & Woessner, P.A.

(57) ABSTRACT

Systems and methods for adding context to prevent data leakage over a computer network are disclosed. Data is classified and contextual information of the data is determined. A transmission policy is determined in response to the classification and contextual information. The data is either transmitted or blocked in response to the classification and the contextual information.

18 Claims, 4 Drawing Sheets

(56) References Cited

U.S. PATENT DOCUMENTS

| | | |
|---|---|---|
| 5,828,835 A | 10/1998 | Isfeld et al. |
| 5,832,228 A | 11/1998 | Holden et al. |
| 5,899,991 A | 5/1999 | Karch |
| 5,905,495 A | 5/1999 | Tanaka et al. |
| 5,919,257 A | 7/1999 | Trostle |
| 5,937,404 A | 8/1999 | Csaszar et al. |
| 6,012,832 A | 1/2000 | Saunders et al. |
| 6,092,194 A | 7/2000 | Touboul |
| 6,185,681 B1 | 2/2001 | Zizzi |
| 6,252,884 B1 | 6/2001 | Hunter |
| 6,301,658 B1 | 10/2001 | Koehler |
| 6,338,088 B1 | 1/2002 | Waters et al. |
| 6,357,010 B1 | 3/2002 | Viets et al. |
| 6,460,141 B1 | 10/2002 | Olden |
| 6,493,758 B1 | 12/2002 | McLain |
| 6,654,787 B1 | 11/2003 | Aronson et al. |
| 6,732,180 B1 | 5/2004 | Hale et al. |
| 6,804,780 B1 | 10/2004 | Touboul |
| 6,832,230 B1 | 12/2004 | Zilliacus et al. |
| 6,988,209 B1 | 1/2006 | Balasubramaniam et al. |
| 7,051,200 B1 | 5/2006 | Manferdelli et al. |
| 7,058,822 B2 | 6/2006 | Edery et al. |
| 7,080,000 B1 | 7/2006 | Cambridge |
| 7,089,589 B2 | 8/2006 | Chefalas et al. |
| 7,100,199 B2 | 8/2006 | Ginter et al. |
| 7,136,867 B1 | 11/2006 | Chatterjee et al. |
| 7,155,243 B2 | 12/2006 | Baldwin et al. |
| 7,185,361 B1 | 2/2007 | Ashoff et al. |
| 7,194,464 B2 | 3/2007 | Kester et al. |
| 7,249,175 B1 | 7/2007 | Donaldson |
| 7,346,512 B2 | 3/2008 | Li-chun Wang et al. |
| 7,376,969 B1 | 5/2008 | Njemanze et al. |
| 7,447,215 B2* | 11/2008 | Lynch .................. H04L 29/06 370/395.54 |
| 7,464,407 B2 | 12/2008 | Nakae et al. |
| 7,522,910 B2 | 4/2009 | Day |
| 7,536,437 B2* | 5/2009 | Zmolek ............... H04L 63/08 455/456.1 |
| 7,617,532 B1 | 11/2009 | Alexander et al. |
| 7,634,463 B1 | 12/2009 | Katragadda et al. |
| 7,644,127 B2 | 1/2010 | Yu |
| 7,693,945 B1 | 4/2010 | Dulitz et al. |
| 7,707,157 B1 | 4/2010 | Shen |
| 7,725,937 B1 | 5/2010 | Levy |
| 7,783,706 B1 | 8/2010 | Robinson |
| 7,787,864 B2 | 8/2010 | Provo |
| 7,814,546 B1 | 10/2010 | Strayer et al. |
| 7,818,800 B1 | 10/2010 | Lemley, III et al. |
| 7,991,411 B2 | 8/2011 | Johnson et al. |
| 8,041,769 B2 | 10/2011 | Shraim et al. |
| 8,065,728 B2 | 11/2011 | Wang et al. |
| 8,078,625 B1 | 12/2011 | Zhang et al. |
| 8,165,049 B2 | 4/2012 | Salmi |
| 8,498,628 B2 | 7/2013 | Shapiro et al. |
| 8,655,342 B2 | 2/2014 | Weinzierl |
| 8,695,100 B1 | 4/2014 | Cosoi |
| 8,769,671 B2 | 7/2014 | Shraim et al. |
| 8,938,773 B2* | 1/2015 | Hubbard ............... H04L 12/585 713/151 |
| 2001/0047474 A1 | 11/2001 | Takagi |
| 2002/0078045 A1 | 6/2002 | Dutta |
| 2002/0087882 A1 | 7/2002 | Schneier et al. |
| 2002/0091947 A1 | 7/2002 | Nakamura |
| 2002/0095592 A1 | 7/2002 | Daniell et al. |
| 2002/0099952 A1 | 7/2002 | Lambert et al. |
| 2002/0129140 A1 | 9/2002 | Peled et al. |
| 2002/0129277 A1 | 9/2002 | Caccavale |
| 2002/0133606 A1 | 9/2002 | Mitomo et al. |
| 2002/0147915 A1 | 10/2002 | Chefalas et al. |
| 2002/0162015 A1 | 10/2002 | Tang |
| 2002/0174358 A1 | 11/2002 | Wolff et al. |
| 2002/0194490 A1 | 12/2002 | Halperin et al. |
| 2002/0199095 A1 | 12/2002 | Bandini et al. |
| 2003/0018491 A1 | 1/2003 | Nakahara et al. |
| 2003/0018903 A1 | 1/2003 | Greca et al. |
| 2003/0074567 A1 | 4/2003 | Charbonneau |
| 2003/0093694 A1 | 5/2003 | Medvinsky et al. |
| 2003/0101348 A1 | 5/2003 | Russo et al. |
| 2003/0110168 A1 | 6/2003 | Kester et al. |
| 2003/0135756 A1 | 7/2003 | Verma |
| 2003/0172292 A1 | 9/2003 | Judge |
| 2003/0177361 A1 | 9/2003 | Wheeler et al. |
| 2003/0185395 A1 | 10/2003 | Lee et al. |
| 2003/0185399 A1 | 10/2003 | Ishiguro |
| 2003/0188197 A1 | 10/2003 | Miyata et al. |
| 2003/0195852 A1 | 10/2003 | Campbell et al. |
| 2003/0202536 A1 | 10/2003 | Foster et al. |
| 2004/0003139 A1 | 1/2004 | Cottrille et al. |
| 2004/0003286 A1 | 1/2004 | Kaler et al. |
| 2004/0034794 A1 | 2/2004 | Mayer et al. |
| 2004/0039921 A1 | 2/2004 | Chuang |
| 2004/0111632 A1 | 6/2004 | Halperin |
| 2004/0111636 A1 | 6/2004 | Baffes et al. |
| 2004/0117624 A1 | 6/2004 | Brandt et al. |
| 2004/0139351 A1 | 7/2004 | Tsang |
| 2004/0153644 A1 | 8/2004 | McCorkendale |
| 2004/0162876 A1 | 8/2004 | Kohavi |
| 2004/0172557 A1 | 9/2004 | Nakae et al. |
| 2004/0187029 A1 | 9/2004 | Ting |
| 2004/0203615 A1 | 10/2004 | Qu et al. |
| 2004/0255147 A1 | 12/2004 | Peled et al. |
| 2004/0260924 A1 | 12/2004 | Peled et al. |
| 2005/0025291 A1 | 2/2005 | Peled et al. |
| 2005/0027980 A1 | 2/2005 | Peled et al. |
| 2005/0033967 A1 | 2/2005 | Morino et al. |
| 2005/0048958 A1 | 3/2005 | Mousseau et al. |
| 2005/0055327 A1 | 3/2005 | Agrawal et al. |
| 2005/0066197 A1 | 3/2005 | Hirata et al. |
| 2005/0086520 A1 | 4/2005 | Dharmapurikar et al. |
| 2005/0091535 A1 | 4/2005 | Kavalam et al. |
| 2005/0108557 A1 | 5/2005 | Kayo et al. |
| 2005/0111367 A1 | 5/2005 | Chao et al. |
| 2005/0120229 A1 | 6/2005 | Lahti |
| 2005/0131868 A1 | 6/2005 | Lin et al. |
| 2005/0138109 A1 | 6/2005 | Redlich et al. |
| 2005/0138353 A1* | 6/2005 | Spies .................. H04L 63/0442 713/153 |
| 2005/0149726 A1 | 7/2005 | Joshi et al. |
| 2005/0210035 A1 | 9/2005 | Kester et al. |
| 2005/0223001 A1 | 10/2005 | Kester et al. |
| 2005/0229250 A1 | 10/2005 | Ring et al. |
| 2005/0251862 A1 | 11/2005 | Talvitie |
| 2005/0273858 A1 | 12/2005 | Zadok et al. |
| 2005/0283836 A1 | 12/2005 | Lalonde et al. |
| 2005/0288939 A1 | 12/2005 | Peled et al. |
| 2006/0004636 A1 | 1/2006 | Kester et al. |
| 2006/0020814 A1 | 1/2006 | Lieblich et al. |
| 2006/0021031 A1 | 1/2006 | Leahy et al. |
| 2006/0026105 A1 | 2/2006 | Endoh |
| 2006/0026681 A1 | 2/2006 | Zakas |
| 2006/0031504 A1 | 2/2006 | Hegli et al. |
| 2006/0036874 A1 | 2/2006 | Cockerille et al. |
| 2006/0053488 A1 | 3/2006 | Sinclair et al. |
| 2006/0068755 A1 | 3/2006 | Shraim et al. |
| 2006/0080735 A1 | 4/2006 | Brinson et al. |
| 2006/0095459 A1 | 5/2006 | Adelman et al. |
| 2006/0095965 A1 | 5/2006 | Phillips et al. |
| 2006/0098585 A1 | 5/2006 | Singh et al. |
| 2006/0101514 A1 | 5/2006 | Milener et al. |
| 2006/0129644 A1 | 6/2006 | Owen et al. |
| 2006/0168006 A1 | 7/2006 | Shannon et al. |
| 2006/0191008 A1 | 8/2006 | Fernando et al. |
| 2006/0212723 A1 | 9/2006 | Sheymov |
| 2006/0251068 A1 | 11/2006 | Judge et al. |
| 2006/0259948 A1 | 11/2006 | Calow et al. |
| 2006/0265750 A1 | 11/2006 | Huddleston |
| 2006/0272024 A1 | 11/2006 | Huang et al. |
| 2006/0277259 A1 | 12/2006 | Murphy et al. |
| 2006/0282890 A1 | 12/2006 | Gruper et al. |
| 2006/0288076 A1 | 12/2006 | Cowings et al. |
| 2007/0005762 A1 | 1/2007 | Knox et al. |
| 2007/0011739 A1 | 1/2007 | Zamir et al. |
| 2007/0027965 A1 | 2/2007 | Brenes et al. |
| 2007/0028302 A1 | 2/2007 | Brennan et al. |

(56) References Cited

U.S. PATENT DOCUMENTS

| | | |
|---|---|---|
| 2007/0067844 A1 | 3/2007 | Williamson et al. |
| 2007/0143424 A1 | 6/2007 | Schirmer et al. |
| 2007/0150827 A1 | 6/2007 | Singh et al. |
| 2007/0156833 A1 | 7/2007 | Nikolov et al. |
| 2007/0195779 A1 | 8/2007 | Judge et al. |
| 2007/0199054 A1 | 8/2007 | Florencio et al. |
| 2007/0220607 A1 | 9/2007 | Sprosts et al. |
| 2007/0250920 A1 | 10/2007 | Lindsay |
| 2007/0260602 A1 | 11/2007 | Taylor |
| 2007/0261112 A1 | 11/2007 | Todd et al. |
| 2007/0294199 A1 | 12/2007 | Nelken et al. |
| 2007/0294428 A1 | 12/2007 | Guy et al. |
| 2007/0294524 A1 | 12/2007 | Katano |
| 2007/0299915 A1 | 12/2007 | Sharim et al. |
| 2008/0009268 A1 | 1/2008 | Ramer et al. |
| 2008/0040804 A1 | 2/2008 | Oliver et al. |
| 2008/0047017 A1 | 2/2008 | Renaud |
| 2008/0086638 A1 | 4/2008 | Mather |
| 2008/0100414 A1 | 5/2008 | Diab et al. |
| 2008/0184369 A1 | 7/2008 | Ahn et al. |
| 2008/0216168 A1 | 9/2008 | Larson et al. |
| 2008/0226069 A1 | 9/2008 | Tan |
| 2008/0262991 A1 | 10/2008 | Kapoor et al. |
| 2008/0267144 A1 | 10/2008 | Jano et al. |
| 2008/0282338 A1 | 11/2008 | Beer |
| 2008/0295177 A1 | 11/2008 | Dettinger et al. |
| 2009/0007243 A1 | 1/2009 | Boodaei et al. |
| 2009/0064326 A1 | 3/2009 | Goldstein |
| 2009/0064330 A1 | 3/2009 | Shraim et al. |
| 2009/0100055 A1 | 4/2009 | Wang |
| 2009/0100518 A1 | 4/2009 | Overcash |
| 2009/0119402 A1 | 5/2009 | Shull et al. |
| 2009/0131035 A1 | 5/2009 | Aiglstorfer |
| 2009/0144823 A1 | 6/2009 | Lamastra et al. |
| 2009/0241191 A1 | 9/2009 | Keromytis et al. |
| 2009/0320135 A1 | 12/2009 | Cavanaugh |
| 2010/0017879 A1 | 1/2010 | Kuegler et al. |
| 2010/0024037 A1 | 1/2010 | Grzymala-Busse et al. |
| 2010/0064347 A1 | 3/2010 | More et al. |
| 2010/0077223 A1 | 3/2010 | Maruyama et al. |
| 2010/0198928 A1 | 8/2010 | Almeida |
| 2010/0257603 A1 | 10/2010 | Chander et al. |
| 2010/0312843 A1 | 12/2010 | Robinson |
| 2012/0047217 A1 | 2/2012 | Hewes et al. |

FOREIGN PATENT DOCUMENTS

| | | |
|---|---|---|
| CN | 101060421 | 10/2007 |
| EP | 1 180 889 | 2/2002 |
| EP | 1 278 330 | 1/2003 |
| EP | 1 280 040 | 1/2003 |
| EP | 1 457 885 | 9/2004 |
| EP | 1 510 945 | 3/2005 |
| EP | 1571578 A | 9/2005 |
| EP | 1 638 016 | 3/2006 |
| EP | 1 643 701 A1 | 4/2006 |
| GB | 2418330 | 3/2006 |
| JP | 2000-235540 | 8/2000 |
| WO | WO 96/05549 A1 | 2/1996 |
| WO | WO 96/42041 | 3/1997 |
| WO | WO 01/24012 | 3/2001 |
| WO | WO 2005/017708 | 2/2005 |
| WO | WO 2005/119488 | 12/2005 |
| WO | WO 2006/027590 | 3/2006 |
| WO | WO 2006/062546 | 6/2006 |
| WO | WO 2006/136605 | 12/2006 |
| WO | WO 2007/059428 A | 5/2007 |
| WO | WO 2007/106609 | 9/2007 |

OTHER PUBLICATIONS

"Trends in Badware 2007", StopBadware.org.
Adam Lyon, "Free Spam Filtering Tactics Using Eudora,", May 21, 2004, pp. 1-4.
Borck, James R., Clearswift makes a clean sweep of Web threats, originally downloaded from http://www.infoworld.com/d/security-central/clearswift-makes-clean-sweep-web-threats-818., Aug. 22, 2007, pp. 2.
Broder et al., Network Applications of Bloom Filters: A Survey, Internet Mathematics, Apr. 13, 2004, vol. 1, Issue 4, pp. 485-509.
Clear Text Password Risk Assessment Documentation, SANS Institute, 2002.
Cohen, F., A Cryptographic Checksum for Integrity Protection, Computers & Security, Elsevier Science Publishers, Dec. 1, 1987, vol. 6, Issue 6, pp. 505-510, Amsterdam, NL.
Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, December, Issue XP000601363, pp. 41-48, Sections 1,3., London.
Gittler F., et al., The DCE Security Service, Pub: Hewlett-Packard Journal, Dec. 1995, pp. 41-48.
Honoroff, Jacob, An Examination of Bloom Filters and their Applications, originally downloaded from http://cs.unc.edu/~fabian/courses/CS600.624/slides/bloomslides.pdf, Mar. 16, 2006, pp. 113.
IBM Technical Disclosure Bulletin, Mean to Protect System from Virus, IBM Corp., Aug. 1, 1994, Issue 659-660.
Igakura, Tomohiro et al., Specific quality measurement and control of the service-oriented networking application., Technical Report of IEICE, IEICE Association, Jan. 18, 2002, vol. 101, Issue 563, pp. 51-56, Japan.
International Search Report and Written Opinion for International Application No. PCT/GB2005/003482, Dec. 9, 2005.
International Search Report for PCT/US2010/035992, Aug. 11, 2010.
IronPort Web Reputation White Paper, A Comprehensive, Proactive Approach to Web-Based Threats, Ironport Systems,, 2009, pp. 10.
IronPort Web Reputation: Protect and Defend Against URL-Based Threats; Ironport Systems, Apr. 2006, 8 pages.
Long, John A., Risk and the Right Model, originally downloaded from http://www.dtic.mil/cgi-bin/GetTRDoc?Location=U2&doc=GEtTRDoc.pdf&AD=ADA161757, Jan. 1986, pp. 13.
PCT International Search Report and Written Opinion for International Application No. PCT/US2008/052483, Feb. 11, 2009.
Reid, Open Systems Security: Traps and Pitfalls, Computer & Security, 1995, Issue 14, pp. 496-517.
Resnick, P. et al., "PICS: Internet Access Controls Without Censorship", Communications of the Association for Comuting Machinery, ACM, Oct. 1, 1996, vol. 39, Issue 10, pp. 87-93, New York, NY.
Rubenking, Neil J., Norton Confidential, originally downloaded from http://www.pcmag.com/article2/0,2817,1999239,00.asp, Aug. 4, 2006, pp. 3.
Ruffo et al., EnFilter: A Password Enforcement and Filter Tool Based on Pattern Recognition Techniques, ICIAP 2005, LNCS 3617, pp. 75-82, 2005.
Shanmugasundaram et al, Payload Attribution via Hierarchical Bloom Filters, CCS, Oct. 25-29, 2004.
Shanmugasundaram et al., ForNet: A Distributed Forensics Network, In Proceedings of the Second International Workshop on Mathematical Methods, Models and Architectures for Computer Networks Security, 2003.
Song et al., Multi-pattern signature matching for hardware network intrusion detection systems, IEEE Globecom 2005, Jan. 23, 2006.
Spafford, Eugene, Prventing Weak Password Choices, Computer Science Technical Reports. Paper 875. http://docs.lib.purdue.edu/cstech/875, 1991.
Stein, Web Security—a step by step reference guide, Addison-Wesley, 1997, pp. 387-415.
Symantec Corporation, E-security begins with sound security policies, Announcement Symantec, XP002265695, Jun. 14, 2001, pp. 1,9.
Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

(56) References Cited

OTHER PUBLICATIONS

Williams, R., Data Integrity with Veracity, Retrieved from the Internet: <URL: ftp://ftp.rocksoft.com/clients/rocksoft/papers/vercty10.ps>, Sep. 12, 1994.
Yang et al., Performance of Full Text Search in Structured and Unstructured Peer-to-Peer Systems, Proceedings IEEE Infocom; originally downloaded from http://ieeexplore.ieee.org/stamp/stamp.jsp?arnumber=04146962, 2006, pp. 12.
Zhang et al., The Role of URLs in Objectionable Web Content Categorization, Web Intelligence, 2006.
Aviv et al., SSARES: Secure Searchable Automated Remote Email Storage, 23rd Annual Computer Security Applications Conference, Jan. 2, 2008, pp. 129-138.
George, Erica, "Google launches new anti-badware API", http://blog.stopbadware.org//2007/06/19/google-launches-new-anti-badware-api, Jun. 19, 2007.
National Institute of Standards (NIST) Special Publication 800-63, Electronic Authentication Guidelin, Apr. 2006, 65 pages.
"U.S. Appl. No. 12/022,838, Examiner Interview Summary mailed Aug. 1, 2011", 4 pgs.
"U.S. Appl. No. 12/022,838, Examiner Interview Summary mailed Aug. 7, 2014", 3 pgs.
"U.S. Appl. No. 12/022,838, Final Office Action mailed Apr. 29, 2011", 13 pgs.
"U.S. Appl. No. 12/022,838, Non Final Office Action mailed May 6, 2014", 16 pgs.
"U.S. Appl. No. 12/022,838, Non Final Office Action mailed Nov. 22, 2010", 16 pgs.
"U.S. Appl. No. 12/022,838, Notice of Allowance mailed Sep. 3, 2014", 5 pgs.
"U.S. Appl. No. 12/022,838, Response filed Feb. 10, 2011 to Non Final Office Action mailed Nov. 22, 2010", 10 pgs.
"U.S. Appl. No. 12/022,838, Response filed Aug. 5, 2014 to Non Final Office Action mailed May 6, 2014", 13 pgs.
"U.S. Appl. No. 12/022,838, Response filed Sep. 27, 2011 to Final Office Action mailed Apr. 29, 2011", 10 pgs.

* cited by examiner

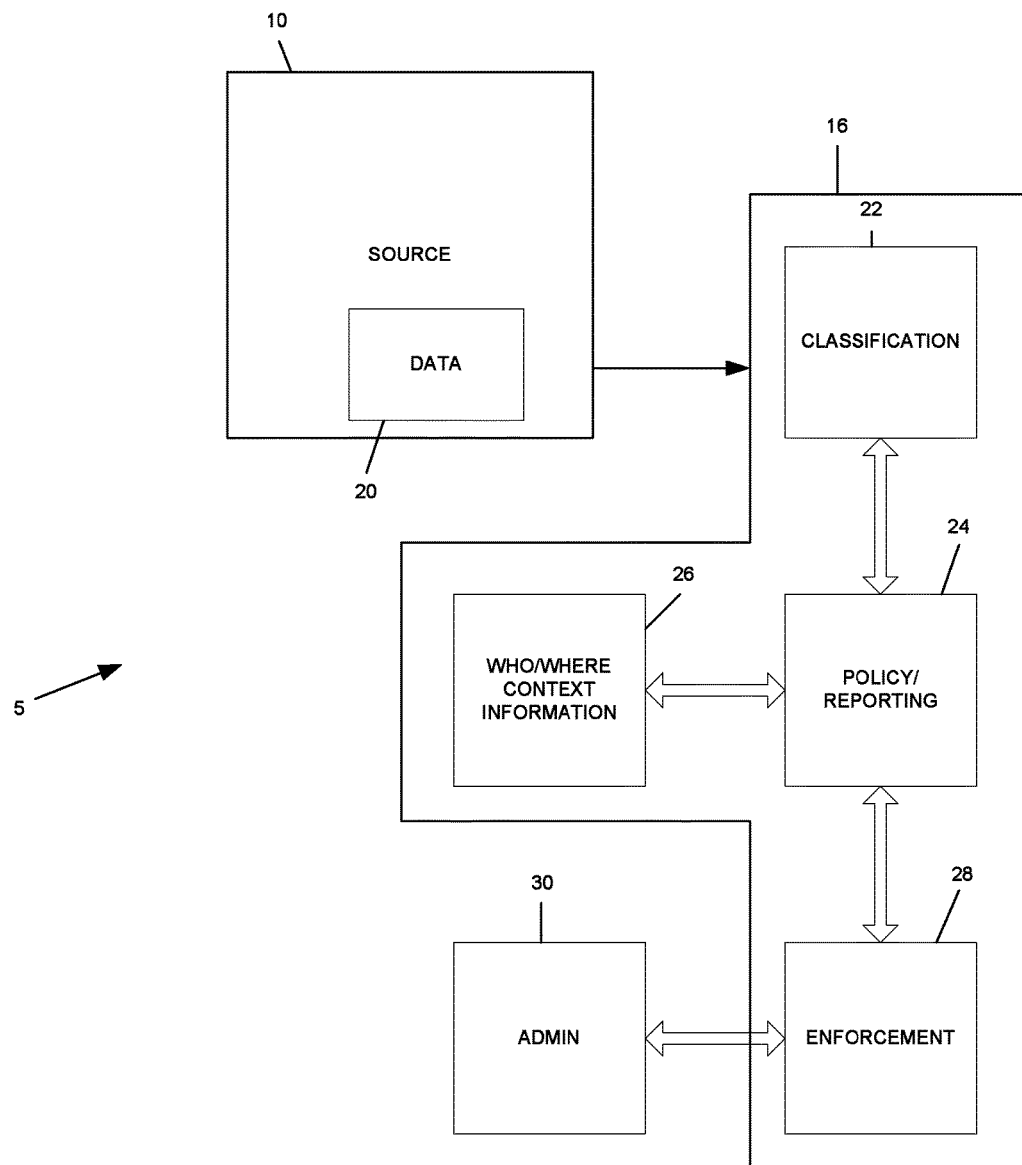
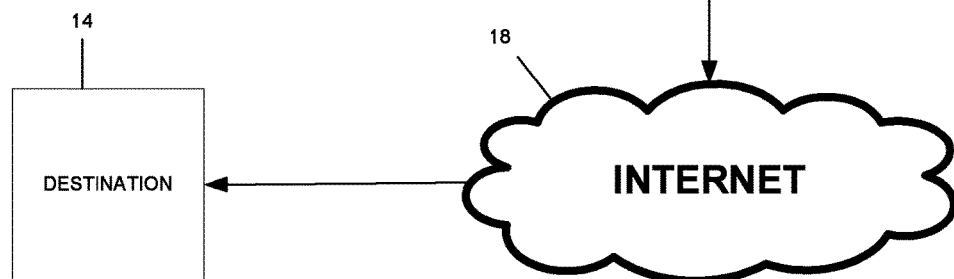
FIGURE 2

SYSTEM AND METHOD FOR ADDING CONTEXT TO PREVENT DATA LEAKAGE OVER A COMPUTER NETWORK

CROSS-REFERENCE TO RELATED APPLICATIONS

This application is a continuation application of U.S. application Ser. No. 12/022,838, filed Jan. 30, 2008, now U.S. Pat. No. 8,938,773, which claims the benefit of U.S. Provisional Patent Application No. 60/887,908, filed on Feb. 2, 2007. The disclosures of these prior applications are considered part of this application, and are hereby incorporated by reference in their entirety.

BACKGROUND OF THE INVENTION

Field of the Invention

This application relates to computer network security.

Description of the Related Technology

Computer networks are used to transmit data between computers in a seamless manner. A user can send a file or an email with an attachment to another user connected to the network. In many instances, this data transfer occurs over the Internet. Often, the content may contain sensitive information (i.e., business plans, financial data, product drawings, trade secrets, etc. . . . ) that should not be sent to the wrong recipient.

The owners of the data have an interest in preventing the leakage of sensitive data over computer networks. Currently, there are methods for analyzing and classifying data being sent over the network. These methods determine the type of data and prevent the dissemination of data classified as being protected. In this regard, these methods classify the data and apply a protection/transmission policy depending on the type of data. For example, a policy might forbid the transmission of any business information containing social security numbers.

However, a policy just based on the type of data may not provide the level of leakage prevention that is needed. For example, sometimes a company might want to limit the transmission of data to certain users or destinations. The analysis of the data itself cannot provide this level of classification and a reliable policy cannot be developed.

SUMMARY OF THE CERTAIN INVENTIVE ASPECTS

In one inventive aspect, a system for preventing the unauthorized transmission of data over a computer network is disclosed. The system has a data source having data in communication with the network. A network (Internet) gateway is in communication with the network and a destination. The network gateway is configured to determine a transmission policy in response to the type of data and contextual information of the data.

The contextual information can be sender contextual information and/or destination contextual information. For example, the sender contextual information may be an IP address of the data source, a user name or a group of users. The destination contextual information may be an IP address of the destination, a network of the destination or a category of the destination. The transmission policy may block transmission of the data, permit transmission of the data and/or report attempted transmission of the data.

Typically, the data source is an electronic device such as a PDA, computer, cell phone, etc. . . . and the devices communicate over the Internet.

The network gateway can include a classification module for determining the type of data, a context information module for determining the contextual information, a policy/reporting module for generating the transmission policy and an enforcement module for either transmitting the data, blocking the data and/or reporting the transmission of the data.

In another inventive aspect, a method of preventing an unauthorized transmission of data over a computer network is disclosed. The method comprises classifying the data and determining contextual information of the data. Next, a transmission policy is determined in response to the classification and contextual information. The data is either transmitted or blocked in response to the classification and the contextual information.

BRIEF DESCRIPTION OF THE DRAWINGS

FIG. 2 is a block diagram illustrating some of the components to prevent data leakage over the computer network shown in FIG. 1.

DETAILED DESCRIPTION OF CERTAIN INVENTIVE EMBODIMENTS

The following detailed description is directed to certain specific embodiments of the invention. However, the invention can be embodied in a multitude of different systems and methods. In this description, reference is made to the drawings wherein like parts are designated with like numerals throughout.

Figure 1:
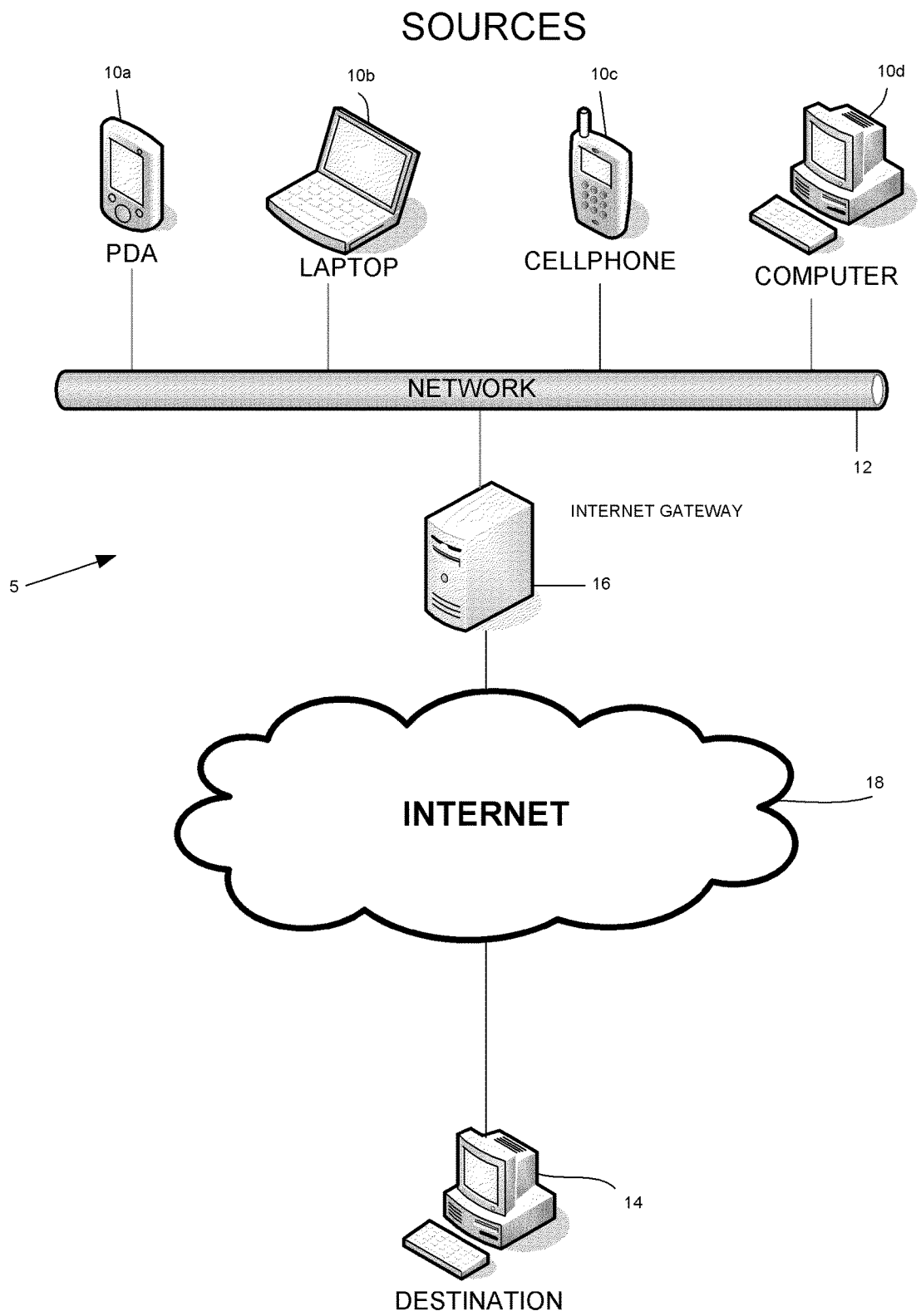
FIG. 1 is a representation of a computer network whereby data leakage prevention using classification and contextual information can occur.

Referring to FIG. 1, a system for preventing the unauthorized transmission of data over a computer network is shown. A user can use a digital device as a source of data 10 (i.e., PDA 10a, laptop computer 10b, cell phone 10c, computer 10d, or other type of digital device) to transmit data over a computer network 12 and Internet 18 to a destination device 14 such as another electronic device. It will be recognized that any type of device 10 can be used as the source of data (i.e., fax machine, scanner, network disk drive, USB memory device, etc. . . . ). The devices 10 are connected to an internal network 12 either through a wired or wireless connection. Each of the devices 10 contain data that may be transmitted. The network 10 can be a local area network (LAN) with a connection to Internet 18. It will be recognized that multiple LAN's can be connected together to from a wide area network (WAN) that could connect to the Internet 18. The network 10 can be an Ethernet 10baseT topology, or based on any networking protocol, including wireless networks, token ring network, and the like.

The network 10 communicates with a network/Internet gateway 16 in order to provide the sources 10 a connection to the Internet 18. The Internet gateway 16 may be a server or combination of servers for translating TCP/IP protocols into proper protocols for communication across the local area network 12. The gateway 16 is well known in the art and normally communicates through routers or other data switching technology. Furthermore, the gateway 16 illustrated in FIG. 1 may include content filtering that prevents users from accessing prohibited websites, as well as a data leakage prevention to prevent prohibited content from traveling outside the network 12 as will be further explained below.

The Internet gateway 16 communicates with the Internet 18 and hence the destination 14 through commonly known techniques. Accordingly, other gateways, routers, switches and/or other devices may be in the path of communication between the Internet 18, the Internet gateway 16, the destination 14, the network 12 and the sources 10. The Internet gateway analyzes TCP/IP traffic passing there through. The destination 14 may be and electronic device, an IP address, email address, network address or other type of recipient.

Referring to FIG. 2, a block diagram showing the components of FIG. 1 is illustrated. The source 10 includes data 20 to be transmitted to the destination 14. The data 20 may be any type of data such as numerical, textual, graphical, etc. . . . The data 10 may be transmitted as an email attachment, instant message, FTP, or anything that can be converted into TCP/IP traffic. The data 20 is transmitted to Internet gateway 16 which contains software (i.e., modules) that prevents the unauthorized dissemination of confidential information. The term "module", as used herein may be, but is not limited to, a software or hardware component, such as a FPGA or ASIC, which performs certain tasks. A module may be configured to reside on an addressable storage medium and configured to execute on one or more processors. Accordingly, a module may include components such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. The tasks to be performed by the modules may be programmed using ordinary techniques as is commonly known.

The Internet gateway 16 includes a classification module 22, a policy/reporting module 24, a who/where context information module 26 and an enforcement module 28. In addition, an administration module 30 may be in communication with the Internet gateway 16 and/or may be incorporated therein.

The classification module 22 analyzes the data 20 to determine whether the data 20 contains prohibited content by identifying a fingerprint and/or signature of the data 20. The fingerprint or signature of the data 20 is compared to a database of signatures in order to identify the content. As such, the classification module 22 determines the content of the data. The who/where context information module 26 determines who sent the data and the destination of the data. For example, the context information module 26 determines who sent the data by identifying the sender using directory services over the network 12. For example, senders can be identified by using a list of users complied in a company's database or using an LDAP service. Typically, the users are also mapped to IP addresses in order to obtain their location. The sender's identification is then used as contextual information that can be applied to the data. For instance, the sender's contextual information may be an IP address of the sender, the user's identity, group identity, or any other type of information that adds further context to the sender of the data 20.

The context information module 26 also determines contextual information regarding the destination of the data 20. For example, by comparing the IP address of the destination to a database of IP addresses sorted by categories, it is possible to categorize the destination. The database of IP addresses includes known IP addresses that are sorted based on contextual information. The IP addresses are grouped into categories depending on the type of destination and content contained. Some non-limiting examples of categories may be "malicious addresses", "competitors", "public sites", etc. . . . The IP addresses are grouped by categories as is commonly known in the web filtering industry and generated by analyzing the destination. In addition to categorizing the destination, it is also possible to add other contextual information such as the network of the destination or just the address of the destination. Therefore, the destination contextual information may be any additional information that further defines the data 20. For example, the destination contextual information may be the reputation of the destination, the name and/or type of entity, the location of the destination, known malicious recipients, etc. . . .

The policy/reporting module 24 is used to determine the policy applied to the data 20. Specifically, based on the classification of the data 20 determined by the classification module 22 and the contextual information determined by the context information module 26, it is possible to generate a policy for the data 20. The policy determines whether the data 20 is to be transmitted, blocked and/or reported, as will be further explained in FIG. 3.

The enforcement module 28 applies the policy to the data 20 and either blocks or transmits the data 20 to the Internet 18. The administration module 30 allows an administrator to change policies and/or allow data 20 to be transmitted after further review.

Figure 3:
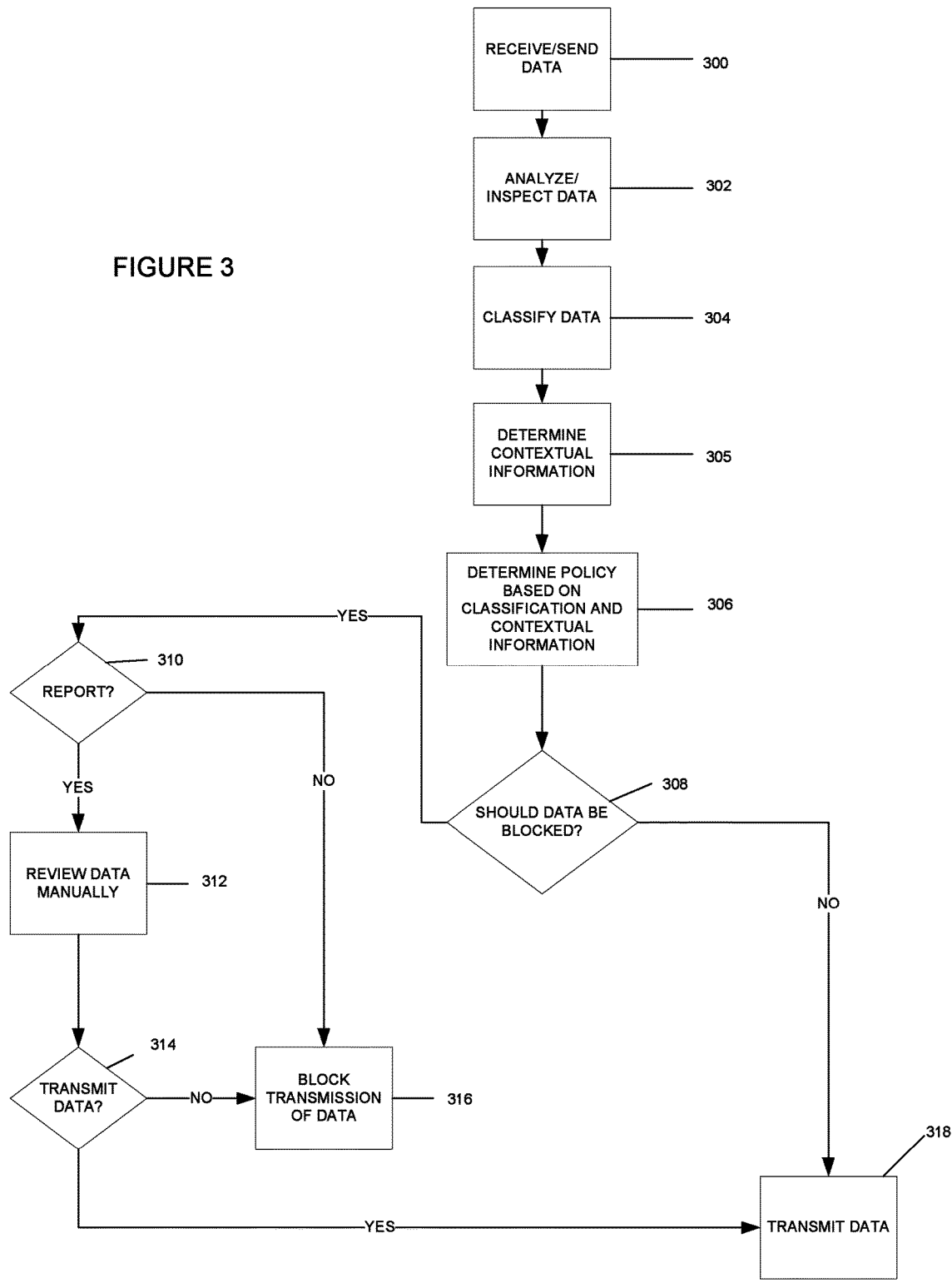
FIG. 3 is a flowchart illustrating the process of preventing data leakage using classification and contextual information.

Referring to FIG. 3, a flowchart for adding contextual information to data leakage prevention is shown. In block 300, data 20 is received or sent by the Internet gateway 16. Next, the data is inspected/analyzed in block 302 and classified in step 304 by classification module 22. As previously mentioned, the data 20 is fingerprinted and a signature is identified in order to determine if the data 20 is information that should be blocked or transmitted.

Next, in block 305, contextual information about the data 20 is determined by who/where context information module 26. Specifically, the "who" of the sender may be one or all of a specific IP address, an individual user or a member of a specified group. The "where" of the destination 14 may be one or all of a category of the destination, the network of the destination or the IP address of the destination.

In block 306 the policy for the data 20 is determined by policy/reporting module 24. The policy is determined using the classification determined from block 304 and the contextual information determined from block 305.

Figure 4:
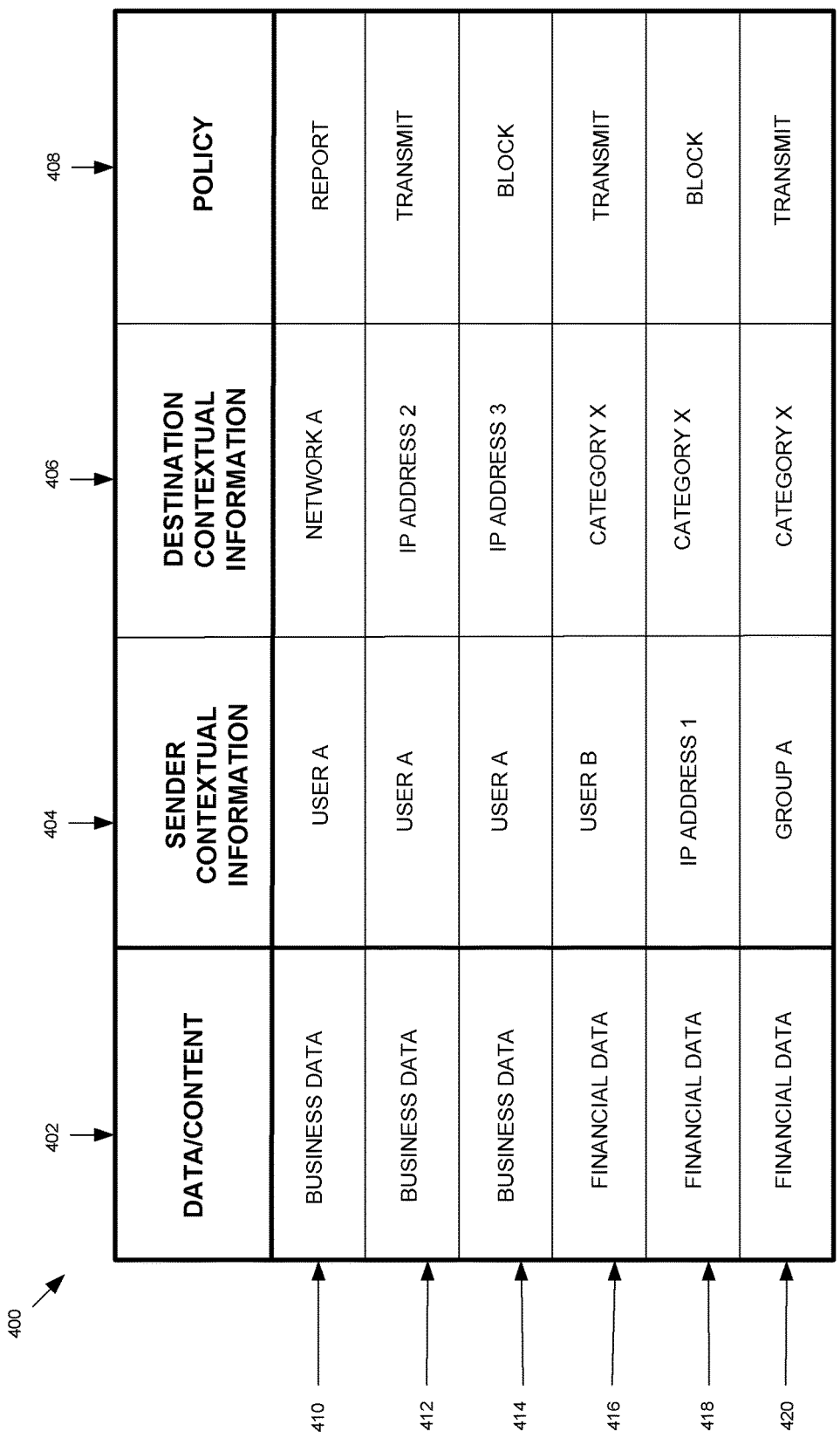
FIG. 4 is a table illustrating how transmission policies are applied to different scenarios.

Referring to FIG. 4, a table showing some exemplary policies is illustrated. The classification of data/content derived from block 304 of FIG. 3 is shown in column 402. The sender's contextual information is listed in column 404, while the destination contextual information is listed in column 406. As previously described, the sender contextual information and the destination contextual information is generated in block 305 of FIG. 3. Column 408 of FIG. 4 lists the policy applied to the data/content for each respective row of the table. For example, in row 410, the data/content is business data, while the sender contextual information indicates that user A sent the information and the destination contextual information indicates that data is to be sent to network A. In this instance, the policy to be applied is to report that user A is attempting to send the data to network A. Rows 412 and 414 show similar scenarios except that the destination contextual information is different. Specifically, in row 412 the data/content is allowed to be transmitted while in row 414 the data/content is blocked because the data/content is being sent to IP address 3 which may be associated with a malicious site. Accordingly, rows 410, 412 and 414 illustrate examples whereby the data/content is the same and the sender is the same, but the policy is different based upon the destination contextual information. Similarly, rows 416, 418 and 420 illustrate an example whereby the data/content is the same and the destination contextual information is the same, but the policy changes based upon the sender contextual information. It will be recognized by those of ordinary skill in the art that many different policies can be configured in order to provide the desired type of security. By both classifying the type of data and using the contextual information it is possible to generate more granular policies. Furthermore, reporting, incident handling, alias usage and priority handling are facilitated by using both classification and contextual information.

Referring back to FIG. 3, in decision block 308, the policy/reporting module 24 determines whether the data should be blocked. If the data 20 should not be blocked then the data is transmitted in block 318 by enforcement module 28. However, if the policy for the data/content is to block the data 20 or report the data 20, then the process proceeds to block 310 whereby it is determined whether the attempt to transmit the data 20 should be reported. If the transmission is not to be reported, then the process proceeds to step 316 where the transmission of the data 20 is blocked by enforcement module 28. However, if the transmission is to be reported, then the process proceeds to step 312 whereby an administrator or other supervisor can review the data, sender and recipient information and determine whether to send the data 20. If the data 20 is to be sent, the process proceeds to block 318 whereby the data 20 is sent. However, the process proceeds to block 316 and the data is not transmitted if the supervisor or administrator believes it is not appropriate to send the data. It will be recognized that it is possible to omit the review manually step 312 and report and block the transmission of the data 20.

While block 308 has been described as blocking data 20, it will be recognized that other types of actions may occur after the policy has been determined in block 306. Specifically, block 308 may initiate a workflow based upon the policy determined in block 306 whereby the data 20 is further analyzed, classified, inspected, etc. . . .

While the above description has shown, described, and pointed out novel features of the invention as applied to various embodiments, it will be understood that various omissions, substitutions, and changes in the form and details of the device or process illustrated may be made by those skilled in the art without departing from the spirit and scope of the invention.

What is claimed is:

1. A system for preventing unauthorized transmission of data over a computer network, the system comprising:
    a network gateway device in communication with the computer network, the network gateway device configured to receive data in transit between a source and a destination, wherein the network gateway device comprises:
    a classification module configured to determine whether the data in transit includes prohibited content,
    a context information module configured to generate destination contextual information related to the destination of the received data, wherein the destination contextual information comprises a categorization of an Internet Protocol (IP) address of the destination, and wherein the categorization of the IP address of the destination is based at least in part on website content stored at the destination, and
    a transmission policy module configured to determine a transmission policy based on the determination of the classification module and the destination contextual information.

2. The system of claim 1, further comprising a database of IP addresses sorted by categories, wherein the categorization of the destination is further based on a comparison of the IP address of the destination to the database of internet protocol addresses.

3. The system of claim 1, wherein the destination contextual information is further based on a geographic location of the destination.

4. The system of claim 1, wherein the context information module is further configured to generate sender contextual information related to the source of the received data, and the transmission policy module is further configured to determine the transmission policy based on the sender contextual information.

5. The system of claim 4, wherein the sender contextual information comprises a user name or a group of users.

6. The system of claim 1, wherein the destination contextual information further comprises an IP address of the destination, a network of the destination or a category of the destination.

7. The system of claim 1, wherein the transmission policy module is further configured to determine whether the network gateway transmits the data or blocks transmission of the data.

8. The system of claim 1, wherein the transmission policy module is further configured to report that the source is attempting to transmit data.

9. The system of claim 1, wherein the data source is an electronic device connected to the computer network, and one of:
    a personal digital assistant (PDA);
    a computer; and
    a cell phone.

10. The system of claim 1, wherein the network gateway further comprises an enforcement module configured to transmit or block the data in response to data received from the transmission policy module.

11. A method of preventing an unauthorized transmission of data over a computer network, the method comprising:
    receiving, at a network gateway device connected to the computer network, data in transit between a source and a destination;
    classifying, using one or more electronic processing circuits, the data to determine whether the data includes prohibited content;
    generating, using the one or more electronic processing circuits, destination contextual information related to the destination of the data, wherein the destination contextual information comprises a categorization of an Internet Protocol (IP) address of the destination, wherein the categorization of the IP address of the destination is based on website content stored at the destination; and
    determining, using the one or more electronic processing circuits, a transmission policy for the data in response to the classification of the data and the destination contextual information.

12. The method of claim 11, further comprising transmitting or blocking the data based on the transmission policy.

13. The method of claim 12, further comprising reporting that the data is to be transmitted.

14. The method of claim 11, wherein the destination contextual information is further based on a geographic location of the destination.

15. The method of claim 11, further comprising storing a database of IP addresses sorted by categories, wherein the categorization of the destination is further based on a comparison of the IP address of the destination to the database of IP addresses.

16. The method of claim 11, further comprising generating sender contextual information related to the source of the data, wherein the determining of a transmission policy for the data further based on the sender contextual information.

17. The method of claim 16, wherein the sender contextual information comprises an IP address of the sender, a user name of a sender of the data in transit or a group name of a sender of the data in transit.

18. The method of claim 11, wherein the source of the data is an electronic device connected to the computer network, wherein the electronic device is one of:
 a personal digital assistant (PDA);
 a computer; and
 a cell phone.

\* \* \* \* \*

UNITED STATES PATENT AND TRADEMARK OFFICE
CERTIFICATE OF CORRECTION

PATENT NO.         : 9,609,001 B2
APPLICATION NO.    : 14/599967
DATED              : March 28, 2017
INVENTOR(S)        : Daniel Lyle Hubbard It is certified that error appears in the above-identified patent and that said Letters Patent is hereby corrected as shown below:

On page 3, in Column 2, under "Other Publications", Line 13, delete "secretservice"" and insert --secret service"-- therefor In Column 2, Line 54, delete "10" and insert --12-- therefor In Column 2, Line 58, delete "10" and insert --12-- therefor In Column 2, Line 61, delete "10" and insert --12-- therefor In Column 3, Line 21, delete "10" and insert --20-- therefor Signed and Sealed this
Tenth Day of July, 2018

Andrei Iancu
*Director of the United States Patent and Trademark Office*